(12) United States Patent
Gold et al.

(10) Patent No.: US 7,986,325 B1
(45) Date of Patent: Jul. 26, 2011

(54) LOADING INTEGER-BASED DATA INTO A GRAPHICS PROCESSING SYSTEM

(75) Inventors: Michael I. Gold, Santa Clara, CA (US); Patrick R. Brown, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1229 days.

(21) Appl. No.: 11/609,848

(22) Filed: Dec. 12, 2006

(51) Int. Cl.
*G06T 1/20* (2006.01)
*G06T 11/40* (2006.01)

(52) U.S. Cl. ......................... 345/506; 345/552
(58) Field of Classification Search .................. 345/501, 345/506, 545, 552, 582, 614
See application file for complete search history.

(56) References Cited

U.S. PATENT DOCUMENTS

| | | | |
|---|---|---|---|
| 6,954,204 B2 * | 10/2005 | Zatz et al. ..................... 345/522 | |
| 7,009,615 B1 | 3/2006 | Kilgard et al. | |
| 7,358,975 B2 * | 4/2008 | Wetzel ........................... 345/582 | |
| 7,532,221 B2 * | 5/2009 | Wetzel ........................... 345/582 | |
| 7,643,032 B2 * | 1/2010 | Wetzel et al. .................. 345/582 | |

OTHER PUBLICATIONS

"ARB_texture_float", NVIDIA Corporation, Oct. 1, 2004, http://oss.sgi.com/projects/ogl-sample/registry/ARB/texture_float.txt.

* cited by examiner

*Primary Examiner* — Kee M Tung
*Assistant Examiner* — Jacinta Crawford
(74) *Attorney, Agent, or Firm* — Patterson & Sheridan, LLP

(57) ABSTRACT

One embodiment of the present invention sets forth a technique for improving the flexibility and programmability of a graphics pipeline by enabling full access to integer texture maps within a graphics processing unit (GPU). A new mechanism for loading and unloading integer texture images is disclosed that enables the shader units within the GPU to have full access to integer values stored within an integer image buffer in a GPU local memory. New integer formats are added to the graphics API that indicate that data should be loaded and processed without the prior art conversion to a floating-point representation, thereby enabling the use of these new integer data types.

20 Claims, 4 Drawing Sheets

LOADING INTEGER-BASED DATA INTO A GRAPHICS PROCESSING SYSTEM

BACKGROUND OF THE INVENTION

1. Field of the Invention

Embodiments of the present invention generally relate to graphics programming and more specifically to loading integer-based data into a graphics processing system.

2. Description of the Related Art

Over the past decade, the cost of adding on-chip logic to processors has substantially decreased. Consequently, certain types of processors, such as advanced graphics processing units (GPUs), now include functionality not previously available in earlier GPU designs. For example, newly introduced GPUs are now able to perform full integer processing operations; whereas, such operations could not be effectively performed on the GPU. One benefit of this new capability is that more efficient graphics processing may now be performed on the GPU, thereby increasing overall performance in the graphics pipeline.

To fully realize additional processing capabilities of advanced GPUs, as much GPU functionality as possible needs to be exposed to graphics application developers. Among other things, doing so enables graphics application developers to tailor their shader programs to optimize the way GPUs process graphics scenes and images. Exposing new full integer GPU processing capabilities to graphics application developers requires that the application programming interface (API) be configured with new calls and libraries that make new features and functionalities directly accessible by developers.

GPU APIs typically expose an interface to graphics application developers that enables an application executing on the host CPU to load image data, in the form of one or more texture maps, into GPU local memory for greater access and processing efficiency by the GPU. Texture map data is commonly represented as one or more intensity values per texture element, called a "texel." For example, a texel may include a single intensity value per texel. Alternately, a texel may include four values, corresponding to red, green and blue intensity, and opacity. Each value within a texel is commonly represented using either a floating-point value, such as a standard 32-bit floating-point number, or a fixed-point normalized value. For example, an 8-bit normalized value includes 256 codes, ranging from 0x00 to 0xFF, where 0x00 corresponds to a floating-point value of "0.0" and 0xFF corresponds to a floating-point value of "1.0." The incremental codes between 0x00 and 0xFF correspond to 254 increasing floating-point values between zero and one.

In prior art GPUs, the data stored in a texture map is used for a very limited scope of computation, typically performed by fixed-function shaders that are limited to using floating-point math. Thus, data retrieved from a texture map by a shader is first converted to a floating-point representation before being presented to the shader. Data written to the texture map by the shader is presumed to originate as floating-point data from the shader and may be converted from the presumed floating-point format to a specific storage format, such as normalized 8-bit values, before being stored. With the introduction of GPUs that able to perform full integer processing, the prior art data path connecting a shader unit to the GPU local memory becomes an impediment to enabling the use of integer data within a texture map. By always casting texture data to a floating-point or normalized representation in this way, the GPU's ability to perform more general computation using data stored in a texture map is highly constrained.

As the foregoing illustrates, what is needed in the art is a mechanism to extend the use of integer data types within texture maps.

SUMMARY OF THE INVENTION

One embodiment of the invention sets forth a method for loading texture data produced by an application program into a local memory of a graphics processing unit. The method includes the steps of determining that the texture data is integer texture image data, where the integer texture image data has a defined packing organization and is comprised of pixels having values expressed in a first integer format, unpacking the texture data into an array of pixels, populating any unpopulated pixel data fields, and storing the texture data within the local memory.

One advantage of the disclosed method it provides new mechanisms for loading and unloading integer texture images into the local memory of a graphics processing unit. These mechanisms enable the different shader units within the graphics processing unit as well as the application program to have full access to the integer data included in the integer texture images.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

As described herein, the term "texture image" broadly refers to texture data that is organized as an array of pixels or texels. A texture image may reside in memory that is typically not accessible for texture mapping using texture mapping techniques. "Pixels" is usually used when discussing texture image data that is a source image or other data transmitted from an application program or when the texture image data is stored a frame buffer memory local to a graphics processing unit, and "texels" is usually used when discussing texture image data that is stored in a texture memory local to the graphics processing unit. The words pixel and texel may be used interchangeably throughout the present application, depending on context, and neither word is intended to limit the scope of the present invention. Texture image data may include conventional image data, such as color components, or may include other types of data also suitable for use as a texture map, e.g., light intensity, height fields, displacement data, and the like. Each pixel or texel making up the texture data may include one or more components. An "integer texture image" is texture image data where each component of the pixels or texels has a signed or unsigned integer value. A prior art "texture map" or "non-integer texture map" is texture image data where each component of the pixels or texels has a non-integer representation such as a floating-point type or normalized integer type. Importantly, when an integer texture image stored in either the texture memory or frame buffer memory is accessed by either the application program or, if possible, by a programmable or fixed function processing engine within the graphics processing unit, signed or unsigned integer values are returned to the application program or processing engine.

Figure 1:
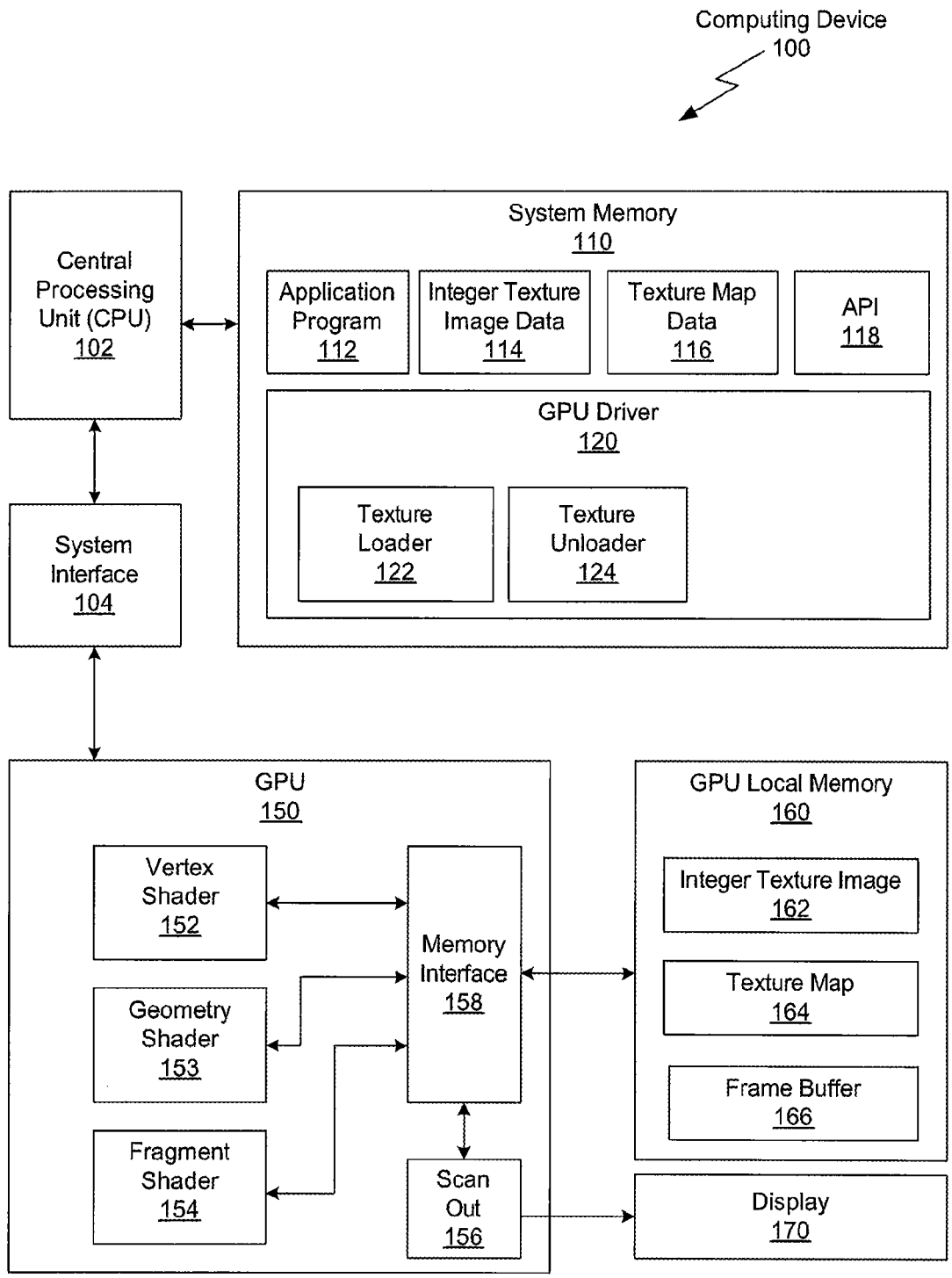
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset or in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU 150 displays certain graphics images stored in the GPU local memory 160 on the display 170.

The system memory 110 includes an application program 112 and integer texture image data 114 that represents one or more integer texture images, an API 118 and a GPU driver 120. The system memory 110 may also include texture map data 116, representing one or more texture maps. The application program 112 generates calls to the API 118 in order to produce a desired set of results, typically in the form of a sequence of graphics images. The application program 112 also transmits integer texture image data 114 and texture map data 116 to the API 118 for processing within the GPU driver 120. The GPU driver 120 includes a texture loader 122 and a texture unloader 124. The texture loader 122 coordinates the transmission of integer texture image data 114 and texture map data 116 to the GPU 150, which then stores this data in the GPU local memory 160. As described below, the texture loader 122 also performs any processing and formatting of the integer texture image data 114 and the texture map data 116, according to the specific requirements of the GPU 150. The texture unloader 124 retrieves data from the GPU local memory 160 on behalf of the application program 112. The texture unloader 124 performs any processing and formatting of the integer texture image data 114 and the texture map data 116, according to the specific request requirements of the application program 112.

The GPU 150 includes a vertex shader 152, a geometry shader 153, a fragment shader 154, a scan out unit 156 and a memory interface 158. As is well-known, the vertex shader 152 receives a sequence of one or more sets of vertex attributes, where each set of vertex attributes is typically associated with a geometric primitive. The vertex shader 152 processes the vertex attributes so that linear interpolation may be performed on the processed vertex data by subsequent processing stages. The vertex shader 152 may also store and retrieve data within the GPU local memory 160. The vertex shader 152 may operate according to a set of fixed-functions or operate according to a set of programming instructions, as determined by the specific class of GPU 150 design. The geometry shader 153 receives sets of processed vertices from the vertex shader 152. The geometry shader 153 performs per-primitive operations on vertices grouped into primitives such as triangles, lines, strips and points generated by the vertex shader 152. The geometry shader 153 may operate according to a set of fixed-functions or operate according to a set of programming instructions, as determined by the specific class of GPU 150 design. The fragment shader 154 processes fragment data, which may include raster position, depth or interpolated vertex attributes, such as texture coordinates, color, opacity, and other relevant per-pixel data, to produce final pixel values. The fragment shader 154 may operate according to a set of fixed-functions or operate according to a set of programming instructions, as determined by the specific class of GPU 150 design.

The memory interface 158 stores and retrieves data within the GPU local memory 160 in response to requests from on-chip clients, such as the vertex shader 152, the geometry shader 153, the fragment shader 154 and the scan out unit 156. The memory interface 158 arbitrates for competing requests for bandwidth, performs address remapping for greater efficiency in the use of the available bandwidth, re-formats data according to the type of buffer being accessed and implements the bus interface protocol used by the GPU local memory 160. The scan out unit 156 retrieves data from the GPU local memory 160 for visible display on the display 170. The scan out unit 156 typically operates under a set of real-time requirements set by the display 170, such as horizontal and vertical refresh rates. The scan out unit 156 should, in some operating modes, be permitted to complete a vertical refresh of an image prior to any modification of the image source buffer to avoid visual "tearing" of the image being displayed.

The GPU local memory 160 includes at least one integer texture image 162 and a frame buffer 166. The GPU local memory 160 may also include one or more texture maps 164. The integer texture image 162 may be generated by copying data from the integer texture image data 114 within system memory 110. Alternately, the integer texture image 162 may be generated procedurally by one of the shader units within the GPU 150, such as the fragment shader 154. The texture map 164 is typically copied from texture map data 116 within system memory 110. Alternately, the texture map 164 may be generated procedurally by one of the shader units within the GPU 150. The texture map 164 and integer texture image 162 store data elements typically organized in one-dimensional, two-dimensional or three-dimensional structures. Data stored within the texture map 164 and integer texture image 162 is typically accessed with the assistance of application specific hardware that provides for a dimensional access view of the data. For example, a two-dimensional surface may be addressed with the assistance of a hardware unit that transposes a horizontal and vertical surface location into a physical memory address that corresponds to the location. The frame buffer 166 includes at least one two-dimensional surface that is used to drive the display 170. The frame buffer 166 may include more than one two-dimensional surfaces so that the GPU 150 can render to one two-dimensional surface while a second two-dimensional surface is used to drive the display 170.

Again, as described herein, the integer texture image 162 comprises an array of texels stored as signed or unsigned integer values and the texture map 164 comprises an array of texels having a non-integer representation or a normalized integer representation that is converted to floating-point when accessed. If stored in the frame buffer 166, the integer texture image and the texture map are stored as an array of pixels.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 166.

Figure 2:
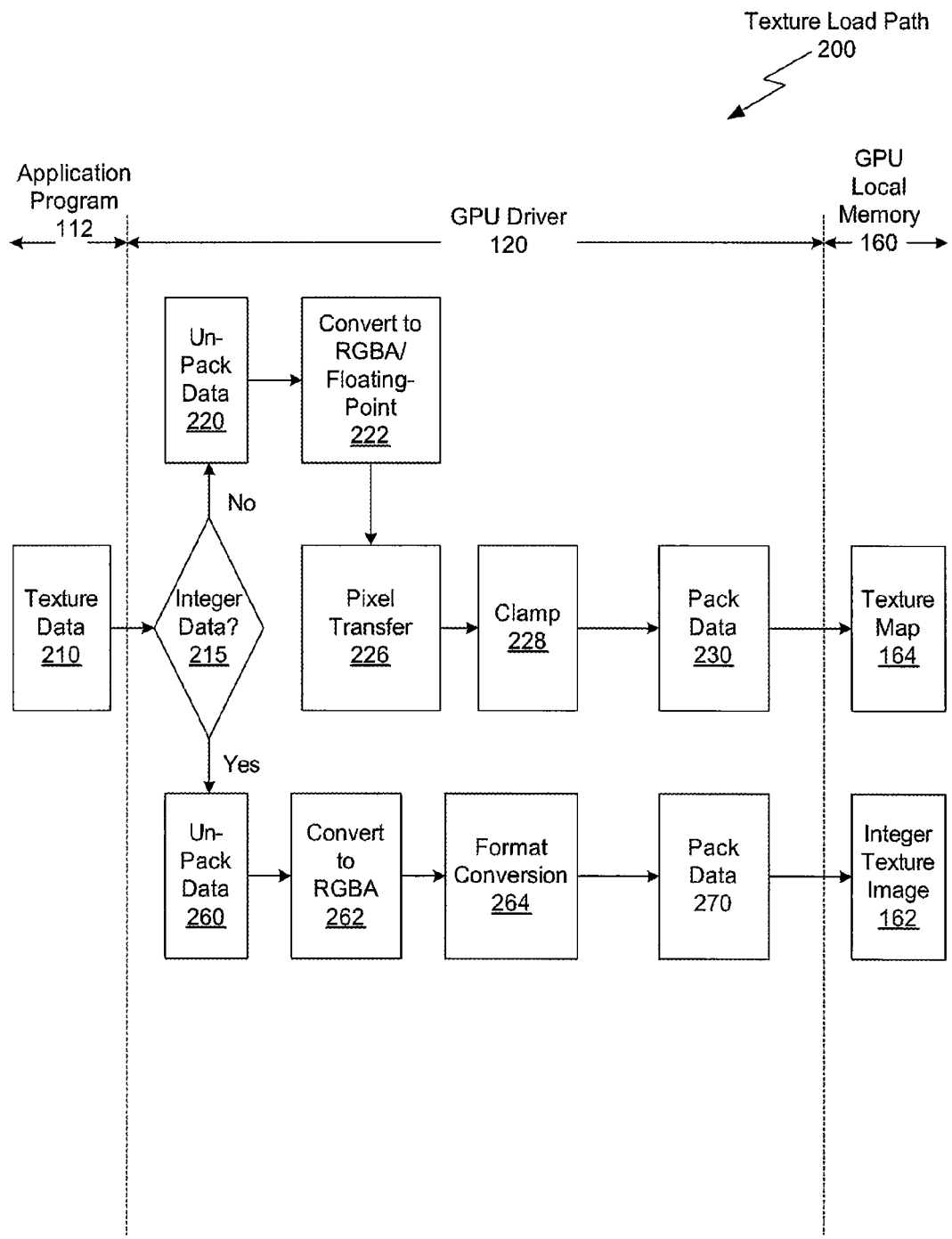
FIG. 2 is a conceptual diagram of a texture load path used for loading textures from system memory into GPU local memory, according to one embodiment of the present invention.

FIG. 2 is a conceptual diagram of a texture load path 200 used for loading textures from system memory 110 into GPU local memory 160. The application program 112 of FIG. 1 presents texture data 210 to the GPU driver 120. The texture data 210 may include, without limitation, integer texture image data 114 and texture map data 116. The GPU driver 120 processes the texture data 210 according to one of two processing pipelines for texture loading. The processing of a texture load request from the application program 112 begins with the GPU driver 120 determining whether the texture data 210 should be processed according to a prior art pipeline for loading the texture map 164 or a newly disclosed pipeline for loading the integer texture image 162. This determination is made in the pipeline at step 215, where the GPU driver 120 examines the texture data 210 and directs the texture data 210 either to a first texture load pipeline beginning with the unpack data engine 220 or to a second texture load pipeline beginning with the unpack data engine 260. Integer data that should be stored without being converted to a floating-point or some other non-integer representation is processed using the second pipeline. In the pipeline step 215, an error should be reported if there is a mismatch in type between the texture data 210 and the type of the destination type (texture map 164 or integer texture image 162).

In one embodiment, the first texture load pipeline within the texture load path 200 proceeds according to the prior art pipeline, described in detail in the OpenGL™ 2.0 specification. This texture load pipeline includes an unpack data engine 220, a convert data to red-green-blue-alpha (RGBA) floating-point unit 222, a pixel transfer engine 226, a clamp unit 228 and a pack data engine 230. The unpack data engine 220 is configured using OpenGL™ functions to unpack a source image, such as texture data 210, and to produce an array of pixels, where each pixel has a specified dimension that includes allocated space for RGBA values. As described in detail in the Open GL 2.0 specification, the pixels within a source image are a sequence of signed or unsigned bytes (GL data types byte and ubyte), signed or unsigned short integers (GL data types short and ushort), signed or unsigned integers (int or uint) or floating-point values (float). These data values are grouped into sets of one, two, three or four values per pixel, depending on the format of the source image. Fixed-point normalized data are then converted from the unpacked source image format to a standard floating-point format in the convert RGBA to floating-point unit 222 using Equation 1, set forth below. The variable f represents the converted floating-point value. The variable c represents the integer value of the bit field within the source image containing the data value being converted. N is the number of bits in the bit field.

$$f=c/(2^N-1) \tag{Equation 1}$$

In the event that the source image format is not a complete RGBA format, the convert RGBA to floating-point unit 222 fills out the unpopulated data fields of the converted pixels with values from one or more data fields of the source pixels. For example, if the source image format includes only luminance, then the convert RGBA to floating-point unit 222 copies the source luminance value to each of the RGBA values in the destination pixel. The pixel transfer engine 226 is configured using OpenGL™ functions to perform scale, bias, convolution and color conversion operations on the converted floating-point data. The pixel transfer engine 226 transmits data to the clamp unit 228, which optionally clamps the data values generated by the pixel transfer engine 226 to the inclusive range of [0.0 to 1.0]. The data generated by the clamp unit 228 is then processed by the pack data engine 230 for efficient storage and access within the texture map 164. The first texture load pipeline thus processes the texture data 210, which may include a significant number of different source formats, into a consistent floating-point format for efficient storage in the texture map 164.

The second texture load pipeline within the texture load path 200 processes data according to a newly introduced pipeline architecture, whereby the texture data 210 generally proceeds from the application program 112 to GPU local memory 160 without modification of the byte values of the texels within the texture data 210. A set of new data formats are added to the API 118 that enable the application 112 to indicate which of the two texture load pipelines should be used to load a given set of texture data 210 into GPU local memory 160. TABLE 1 lists these new data formats.

TABLE 1

| Format Name | Format Identifier |
| --- | --- |
| RED_INTEGER_EXT | 0x8D94 |
| GREEN_INTEGER_EXT | 0x8D95 |
| BLUE_INTEGER_EXT | 0x8D96 |
| ALPHA_INTEGER_EXT | 0x8D97 |
| RGB_INTEGER_EXT | 0x8D98 |
| RGBA_INTEGER_EXT | 0x8D99 |
| BGR_INTEGER_EXT | 0x8D9A |
| BGRA_INTEGER_EXT | 0x8D9B |
| LUMINANCE_INTEGER_EXT | 0x8D9C |
| LUMINANCE_ALPHA_INTEGER_EXT | 0x8D9D |

More specifically, in step 215, if GPU driver 120 determines that texture data 210 is in one of the integer formats listed in TABLE 1, then GPU driver 120 processes texture data 210 through the second texture load pipeline, which includes an unpack data engine 260, a convert to RGBA unit 262, a format conversion unit 264 and to pack data unit 270. The unpack data engine 260 operates on the data formats specified in TABLE 1, producing an array of pixels similar to the array produced by the unpack data engine 230. Each populated field for each pixel within the source image is copied to the corresponding field and pixel within the array of pixels. In the event that the source image format is not a complete RGBA format, the convert to RGBA unit 262 fills out the unpopulated data fields of the unpacked pixels with values from one or more data fields of the source pixels. For example, in the LUMI- NANCE and LUMINANCE_ALPHA formats, the red, green and blue components are filled with the luminance values. Any remaining unpopulated fields are filled with predefined default values. In one embodiment, the pixel values may be expressed as signed or unsigned integer values that are 8, 16 or 32 bits in length. The format conversion unit 264 converts between these integer formats, should the need arise. For example, a source image using signed 8-bit values should undergo sign extension if the integer texture image 162 uses a signed 32-bit format. In another example, a source image using unsigned 32-bit values would be clamped to the range [0,255] if the integer texture image 162 uses an unsigned 8-bit format. Unless operations such as sign extension or maximum/minimum clamping are useful to preserve the integer value of a source image, the format conversion unit 264 passes data through unmodified. The pack data unit 270 organizes the resulting data for efficient storage within the integer texture image 162.

Figure 3:
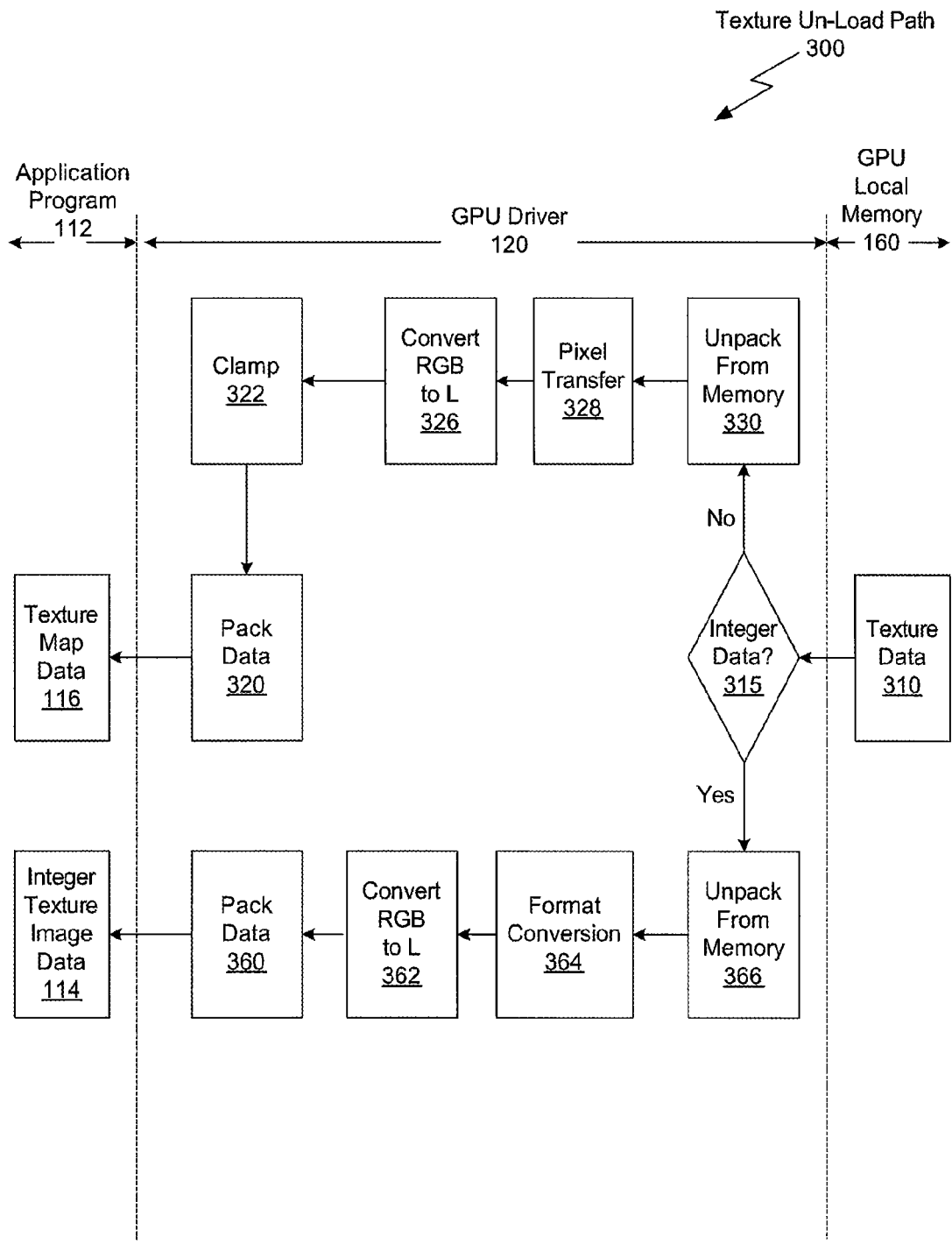
FIG. 3 is a conceptual diagram of a texture un-load path used for unloading textures from GPU local memory into system memory, according to one embodiment of the present invention.

FIG. 3 is a conceptual diagram of a texture un-load path 300 used for unloading textures from GPU local memory 160 into system memory 110. In one embodiment, texture data 310 may be unloaded from GPU local memory 160 to system memory 110 of FIG. 1 in response to a request from the application program 112. The process of unloading texture data 310 follows one of two pipelines, depending on the type of texture data 310 being unloaded. Similar to a loading operation, in step 315, GPU driver 120 directs processing along one of the two pipelines. A mismatch between the texture data 310 and the selected destination type (texture map data 116 or integer texture image data 114) should cause an error to be reported. A first texture unload pipeline, corresponding to the prior art approach of unloading non-integer texture data from GPU local memory 160, includes an unpack from memory engine 330, a pixel transfer engine 328, a convert RGB to L unit 326, a convert from RGBA/floating-point unit 324, a clamp unit 322 and a pack data engine 320 that generates texture map data 116.

The unpack from memory engine 330 reverses any packing, remapping or formatting performed by the pack data engine 230 of FIG. 2 and presents the pixel transfer engine 328 with floating-point values from the texture data 310. The pixel transfer engine 328 is configured using OpenGL™ functions to perform scale, bias, convolution and color conversion operations on the floating-point data. The pixel transfer engine 328 transmits data to the convert RGB to L unit 326, which in turn restructures the floating-point RGB data, if necessary, in accordance with the format of texture map data 116. The restructured data is transmitted to the clamp unit 322, which optionally clamps the output values to a specified range. For example, a floating-point number maybe clamped to the range of [0.0-1.0]. The pack data engine 320 then stores the clamped pixel data using the pixel packing organization specified for the texture map data 116. The pack data engine 320 performs any remaining conversions to a specific format for storage, as requested by the application program 112. The OpenGL™ 2.0 specification defines the different packing organizations that may be implemented by the pack data engine 320.

The second texture unload pipeline within the texture load path 300 processes data according to a newly introduced pipeline architecture, whereby the texture data 310 generally proceeds from the GPU local memory 160 to the application program 112 without modification of the byte values of the texels within the texture data 310. More specifically, GPU driver 120 processes texture data 310 through this second pipeline when GPU driver 120 determines, in step 315, that the texture data 310 is in one of the integer formats listed in TABLE 1. The second pipeline includes an unpack from memory engine 366, a format conversion unit 364, a convert RGBA to L unit and a pack data engine 360.

The unpack from memory engine 366 reverses any remapping, packing or formatting performed by the pack data engine 270 of FIG. 2 and presents the format conversion unit 364 with integer values from the texture data 310. The integers values are passed to the format conversion unit 364, which may resize the integer values according to the format of the integer texture image data 114. For example, a signed 16-bit integer within the texture data 310 may be sign-extended to conform to a signed 32-bit format within the integer texture image data 114. The convert RGB to L unit 362 performs any organizational modifications to the data received from the format conversion unit 364 necessary to conform to the format of the integer texture image data 114. The pack data engine 360 then clamps the pixel data to a range that is representable within the integer texture image data 114 and stores the pixel data using the packing organization in the integer texture image data 114. Again, the pack data engine 360 uses the OpenGL™ 2.0 specification for packing formats, which are organized according to elements per pixel and bytes per element.

FIGS. 2 and 3 illustrate texture load and texture unload mechanisms whereby the application program 112 may perform read and write accesses to the integer texture image 162, stored within GPU local memory 160. The integer texture image 162 stores "un-normalized" integer values that remain unmodified through read and write operations. In contrast, data stored in a prior art "normalized" fixed-point format is always presented as floating-point values to clients accessing the data, limiting the use of normalized data to floating-point type computations. In alternative embodiments of the present invention, the vertex shader 152, the geometry shader 153 and the fragment shader 154 may each be configured to access unmodified integer values within the integer texture image 162 in a fashion analogous to the application program 112.

In addition, even though FIG. 3 describes unloading texture data stored in either texture map 164 or integer texture image 162 within GPU local memory 166 using the load path 200 of FIG. 2, in alternative embodiments, un-load path 300 of FIG. 3 may be used to unload texture data stored in frame buffer 166 within GPU local memory 166 using the load path described below in FIG. 4.

Figure 4:
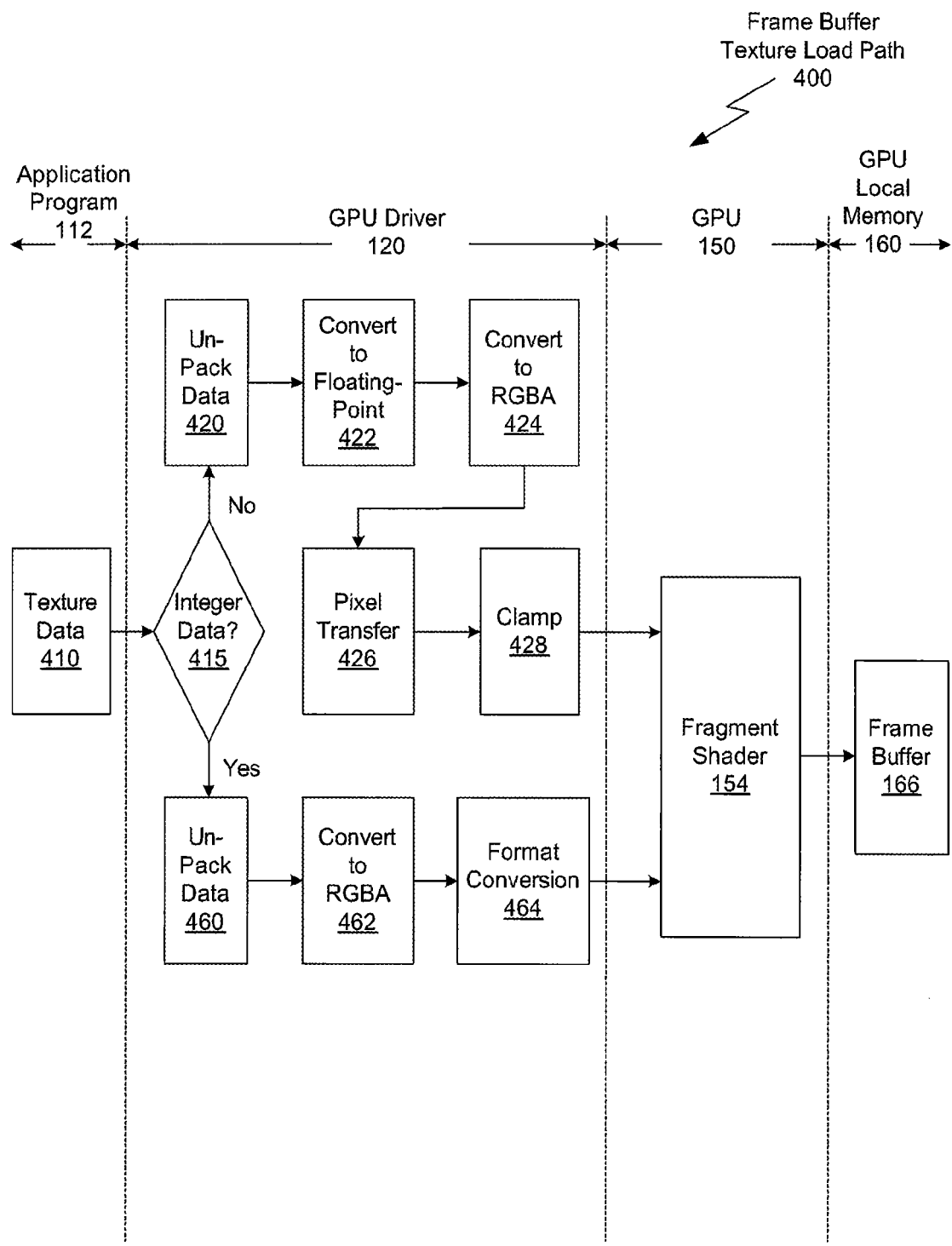
FIG. 4 is a conceptual diagram of a frame buffer texture load path used for loading textures from system memory into the frame buffer within GPU local memory, according to one embodiment of the present invention.

FIG. 4 is a conceptual diagram of a frame buffer load path 400 used for loading textures from system memory 110 into the frame buffer 166 within GPU local memory 160. The application program 112 of FIG. 1 presents texture data 410 to the GPU driver 120 using, for example, the DrawPixels( ) OpenGL™ API command. The texture data 410 may include, without limitation, integer texture image data 114 and/or texture map data 116. The GPU driver 120 processes the texture data 410 according to one of two processing pipelines for texture loading. The processing of a texture load request from the application program 112 begins with the GPU driver 120 determining whether the texture data 410 should be processed according to a prior art pipeline for loading non-integer data into the frame buffer 166 or a newly disclosed pipeline for loading integer data into the frame buffer 166. This determination is made in the pipeline at step 415, where the GPU driver 120 examines the texture data 410 and directs the texture data 410 either to a first texture load pipeline beginning with the unpack data engine 420 or to a second texture load pipeline beginning with the unpack data engine 460. Integer data that should be stored within the frame buffer

166 without being converted to a floating-point or some other non-integer representation is processed using the second pipeline.

In one embodiment, the first texture load pipeline within the frame buffer load path 400 proceeds according to the prior art pipeline, described in detail in the OpenGL™ 2.0 specification. This texture load pipeline includes an unpack data engine 420, a convert data to floating-point unit 422, a convert to RGBA unit 424, a pixel transfer engine 426, a clamp unit 428 and the fragment shader 154. The unpack data engine 420 is configured using OpenGL™ functions to unpack a source image, such as texture data 410, and to produce an array of pixels, where each pixel has a specified dimension that includes allocated space for RGBA values. As described in detail in the Open GL 2.0 specification, the pixels within a source image are a sequence of signed or unsigned bytes. These data values are grouped into sets of one, two, three or four values per pixel, depending on the format of the source image. Fixed-point normalized data are then converted from the unpacked source image format to a standard floating-point format in the convert data to floating-point unit 422 using Equation 1, set forth previously herein.

In the event that the source image format is not a complete RGBA format, the convert to RGBA unit 424 fills out the unpopulated data fields of the converted pixels with a combination of predefined constant values and values from one or more data fields of the source pixels. For example, in the LUMINANCE and LUMINANCE_ALPHA formats, the red, green and blue components are filled with the luminance values. Any remaining unpopulated fields are filled with pre-defined default values. The pixel transfer engine 426 is configured using OpenGL™ functions to perform scale, bias, convolution and color conversion operations on the converted floating-point data. The pixel transfer engine 426 transmits data to the clamp unit 428, which clamps the data values generated by the pixel transfer engine 426 to the inclusive range of [0.0 to 1.0]. The data generated by the clamp unit 428 is then used to generate fragments that are processed by the fragment shader 154, which provides access to the frame buffer 166 within GPU local memory 160. The DrawPixels( ) OpenGL™ API command may be used to engage the fragment shader 154 to provide the write path to the frame buffer 166. The first texture load pipeline thus processes the texture data 410, which may include a significant number of different source formats, into a consistent floating-point or normalized integer format for storage in the frame buffer 166. When the frame buffer 166 is configured to store a normalized integer format, the outputs of the fragment shader 154 are converted to a fixed-point value for storage The second texture load pipeline within the frame buffer load path 400 processes data according to a newly introduced pipeline architecture, whereby the texture data 410 generally proceeds from the application program 112 to the frame buffer 166 within GPU local memory 160 without modification of the byte values of the texels within the texture data 410. Again, Table 1 sets forth a set of new data formats that are added to the API 118 that enable the application 112 to indicate which of the two texture load pipelines should be used to load a given set of texture data 410 into the frame buffer 166 within GPU local memory 160.

More specifically, in step 415, if GPU driver 120 determines that texture data 410 is in one of the formats listed in TABLE 1, then GPU driver 120 processes texture data 410 through the second texture load pipeline, which includes an unpack data engine 460, a convert to RGBA unit 462, a format conversion unit 464 and to pack data unit 470. The unpack data engine 460 operates on the data formats specified in TABLE 1, producing an array of pixels similar to the array produced by the unpack data engine 430. In the event that the source image format is not a complete RGBA format, the convert to RGBA unit 462 fills out the unpopulated data fields according to well-known prior art techniques. In one embodiment, the pixel values may be expressed as signed or unsigned integer values that are 8, 16 or 32 bits in length. The format conversion unit 464 converts between integer formats, should the need arise, but otherwise passes data through unmodified. For example, a source image using signed 8-bit values should undergo sign extension if the frame buffer format is a signed 32-bit format. The data generated by the format conversion unit 464 are then processed by the fragment shader 154, which provides access to the frame buffer 166 within GPU local memory 160. The DrawPixels( ) OpenGL™ API command may be used to engage the fragment shader 154 to provide the write path to the frame buffer 166. In such a scenario, the fragment shader 154 should be compiled to expect the input colors associated with input fragments to be integer values.

In sum, three types of texture access mechanisms are added to a computing device that incorporates a GPU co-processor capable of full integer math operations. The first mechanism provides full integer texture loading and un-loading between the system memory and the GPU local memory. This process is invoked by a graphics application using new integer data types added to the API. The second mechanism enables GPU shader units to access integer texture image data directly and without compulsory casting operations being performed on the data. The third mechanism enables the GPU to render texture data directly into the frame buffer via the fragment shader.

In one embodiment of the invention, a computer-readable medium includes instructions that, when executed by a processor, cause the processor to load texture data produced by an application program into a local memory of a graphics processing unit, by performing the steps of determining that the texture data is integer texture image data, wherein the integer texture image data has a defined packing organization and is comprised of pixels having values expressed in a first integer format, unpacking the texture data into an array of pixels, populating any unpopulated pixel data fields, and storing the texture data within the local memory.

While the forgoing is directed to embodiments of the present invention, other and further embodiments of the invention may be devised without departing from the basic scope thereof, and the scope thereof is determined by the claims that follow.

All trademarks are the respective property of their owners.

We claim:

1. A method for loading texture data produced by an application program into a local memory of a graphics processing unit, the method comprising:
   determining that the texture data is integer texture image data, wherein the integer texture image data has a defined packing organization and is comprised of pixels having values expressed in a first integer format;
   determining, based on the first integer format, that the texture data should be loaded via a first texture load pipeline that is configured to process only integer data;
   unpacking the texture data into an array of pixels having values expressed in the first integer format or a second integer format;
   populating any unpopulated pixel data fields in the array of pixels, wherein the unpopulated pixel data fields have values expressed in the first integer format or the second integer format; and
   storing the array of pixels within the local memory.

2. The method of claim 1, further comprising the step of organizing the array of pixels into a format conducive for storing in the local memory.

3. The method of claim 1, wherein the step of storing comprises writing the array of pixels to an integer texture image within the local memory.

4. The method of claim 3, further comprising the step of converting the first integer format into the second integer format, wherein the array of pixels is configured using the second integer format.

5. The method of claim 3, wherein a processing engine within the graphics processing unit is configured to read the array of pixels directly from the local memory.

6. The method of claim 1, further comprising the step of transmitting the array of pixels to a fragment shader within the graphics processing unit.

7. The method of claim 6, wherein the step of storing comprises the fragment shader providing a write path to a frame buffer within the local memory.

8. The method of claim 1, further comprising the steps of reading the array of pixels stored in the local memory, organizing the array of pixels into the format of the integer texture image data, and storing the array of pixels in a memory accessible by the application program using the defined packing organization of the integer texture image data.

9. A non-transitory computer-readable medium including instructions that when executed by a processor cause the processor to load texture data produced by an application program into a local memory of a graphics processing unit, by performing the steps of:
   determining that the texture data is integer texture image data, wherein the integer texture image data has a defined packing organization and is comprised of pixels having values expressed in a first integer format;
   determining, based on the first integer format, that the texture data should be loaded via a first texture load pipeline that is configured to process only integer data;
   unpacking the texture data into an array of pixels having values expressed in the first integer format or a second integer format;
   populating any unpopulated pixel data fields in the array of pixels, wherein the unpopulated pixel data fields have values expressed in the first integer format or the second integer format; and storing the array of pixels within the local memory.

10. A computing device configured to load texture data produced by an application into a memory, the computing device comprising:
    a graphics processing unit;
    a local memory coupled to the graphics processing unit; and
    a software driver configured to:
       determine that the texture data is integer texture image data, wherein the integer texture image data has a defined packing organization and is comprised of pixels having values expressed in a first integer format,
       determine, based on the first integer format, that the texture data should be loaded via a first texture load pipeline that is configured to process only integer data;
       unpack the texture data into an array of pixels having values expressed in the first integer format or a second integer format;
       populate any unpopulated pixel data fields in the array of pixels, wherein the unpopulated pixel data fields have values expressed in the first integer format or the second integer format; and
       store the array of pixels within the local memory.

11. The computing device of claim 10, wherein the software driver is further configured to organize the array of pixels into a format conducive for storing in the local memory.

12. The computing device of claim 10, wherein the software driver is further configured to write the array of pixels to an integer texture image within the local memory.

13. The computing device of claim 12, wherein the software driver is further configured to convert the first integer format into the second integer format, wherein the array of pixels is configured using the second integer format.

14. The computing device of claim 12, wherein the graphics processing unit includes a processing engine that is configured to read the array of pixels directly from the local memory.

15. The computing device of claim 14, wherein the graphics processing unit is programmable.

16. The computing device of claim 15, wherein the graphics processing unit is a fixed-function processing unit.

17. The computing device of claim 10, wherein the graphics processing unit includes a fragment shader, and the software driver is further configured to transmit the array of pixels to the fragment shader.

18. The computing device of claim 17, wherein the fragment shader is configured to provide a write path to a frame buffer within the local memory for the array of pixels.

19. The computing device of claim 10, wherein the software driver is further configured to read the array of pixels stored in the local memory, organize the array of pixels into the format of the integer texture image data, and store the array of pixels in a memory accessible by the application program using the defined packing organization of the integer texture image data.

20. The computing device of 19, wherein the software driver reads the array of pixels from either an integer texture image within the local memory or a frame buffer within the local memory.

* * * * *